United States Patent
Evert

(10) Patent No.: US 11,813,927 B2
(45) Date of Patent: Nov. 14, 2023

(54) SIDE STRUCTURE FOR A PASSENGER VEHICLE WITH A LOWERABLE SIDE WINDOW, AND PASSENGER VEHICLE

(71) Applicant: Bayerische Motoren Werke Aktiengesellschaft, Munich (DE)

(72) Inventor: Martin Evert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/292,520

(22) PCT Filed: Sep. 5, 2019

(86) PCT No.: PCT/EP2019/073638
§ 371 (c)(1),
(2) Date: May 10, 2021

(87) PCT Pub. No.: WO2020/098991
PCT Pub. Date: May 22, 2020

(65) Prior Publication Data
US 2021/0394592 A1 Dec. 23, 2021

(30) Foreign Application Priority Data
Nov. 13, 2018 (DE) .................. 10 2018 128 307.5

(51) Int. Cl.
*E05D 15/00* (2006.01)
*B60J 1/14* (2006.01)
(Continued)

(52) U.S. Cl.
CPC ................. *B60J 1/14* (2013.01); *B60J 1/008* (2013.01); *E05D 15/28* (2013.01)

(58) Field of Classification Search
CPC ..... E05D 15/28; E05D 15/20; E05D 15/1013; E05D 15/10; B60J 1/008; B60J 1/14; B60J 1/12
(Continued)

(56) References Cited

U.S. PATENT DOCUMENTS 6,030,024 A * 2/2000 Schmidhuber ......... B60J 5/0497
296/146.12

FOREIGN PATENT DOCUMENTS

CN  2926325 Y  7/2007
CN  203293859 U  11/2013
(Continued)

OTHER PUBLICATIONS

English translation of JP05185834 (Year: 1993).*
(Continued)

*Primary Examiner* — Daniel J Troy
*Assistant Examiner* — Daniel Alvarez
(74) *Attorney, Agent, or Firm* — Crowell & Moring LLP

(57) ABSTRACT

A side structure for a passenger vehicle has a side element, which at least partially delimits a lateral window opening, and a transparent side window, which is movable relative to the side element between a closed position closing at least a partial region of the window opening and at least one open position opening up the partial region of the window opening. The side structure has a strut which extends in the longitudinal direction of the vehicle and on which the side window is held via a hinge device so as to be movable relative to the side element and relative to the strut in such a manner that the side window is movable outwards in the transverse direction of the vehicle and downwards in the vertical direction of the vehicle from the closed position into the open position.

13 Claims, 2 Drawing Sheets

(51) Int. Cl.
  *B60J 1/00*   (2006.01)
  *E05D 15/28*  (2006.01)

(58) Field of Classification Search
  USPC .................................. 49/209, 210, 348, 349
  See application file for complete search history.

(56) References Cited

FOREIGN PATENT DOCUMENTS

| | | | |
|---|---|---|---|
| DE | 197 04 811 C1 | 10/1998 | |
| DE | 10 2013 218 388 A1 | 3/2015 | |
| DE | 102013218388 A1 * | 3/2015 | ................ B60J 1/12 |
| DE | 10 2017 002 256 A1 | 9/2018 | |
| EP | 0 962 346 A1 | 12/1999 | |
| EP | 0962346 A1 * | 12/1999 | ............. E05D 15/10 |
| EP | 1674379 A1 * | 6/2006 | ............ B60J 5/0497 |
| FR | 814847 A | 6/1937 | |
| JP | 5-185834 A | 7/1993 | |
| JP | 05185834 * | 7/1993 | |
| JP | 05185834 A * | 7/1993 | |

OTHER PUBLICATIONS

English translation of DE102013218388 (Year: 2015).*
International Search Report (PCT/ISA/210) issued in PCT Application No. PCT/EP2019/073638 dated Dec. 13, 2019 with English translation (four (4) pages).
German-language Written Opinion (PCT/ISA/237) issued in PCT Application No. PCT/EP2019/073638 dated Dec. 13, 2019 (five (5) pages).
German-language Office Action issued in German Application No. DE 10 2018 128 307.5 dated Jun. 14, 2019 (four (4) pages).
English-language Chinese Office Action issued in Chinese application No. 201980073902.9 dated May 12, 2023 (Six (6) pages).

* cited by examiner

SIDE STRUCTURE FOR A PASSENGER VEHICLE WITH A LOWERABLE SIDE WINDOW, AND PASSENGER VEHICLE

BACKGROUND AND SUMMARY OF THE INVENTION

The invention relates to a side structure for a passenger vehicle with a side element, which at least partially delimits a lateral window opening, and with a transparent side window, which is movable relative to the side element between a closed position closing at least a partial region of the window opening and at least one open position opening up the partial region of the window opening. The invention furthermore relates to a passenger vehicle with such a side structure.

DE 197 04 811 C1 discloses a vehicle door for closing a door opening in an outer wall of a vehicle.

Passenger vehicles are moreover well known from the general prior art and in particular from series production of vehicles. A conventional passenger vehicle of this type customarily has self-supporting bodywork which delimits lateral door openings. Side doors are held on the body, by means of which the door openings can be at least partially closed. The respective side door customarily has a door bodyshell and a transparent side window which can be moved in a translatory manner relative to the door bodyshell in the vertical direction of the vehicle. The side window can thereby be moved, for example, between a closed position and at least one open position. In the closed position, the side window at least partially closes a corresponding window opening of the respective side door, and, in the open position, the side window at least partially opens up the window opening. The side window can be opened here in such a manner that the side window is moved in a translatory manner downward in the vertical direction of the vehicle relative to the door bodyshell and is thus lowered. The side window is customarily lowered here in a window well of the side door.

It is the object of the present invention to improve a side structure and a passenger vehicle of the type mentioned at the beginning.

This object is achieved according to the invention by a side structure and by a passenger vehicle with the features of the independent claims. Advantageous developments of the invention can be gathered from the dependent claims.

A first aspect of the invention relates to a side structure for a passenger vehicle. In the fully manufactured state of the passenger vehicle, the side structure, for example, at least partially, in particular at least predominantly or completely, delimits the interior of the passenger vehicle outward in the transverse direction of the vehicle. The side structure has at least one side element, which at least partially, in particular at least predominantly or completely, delimits a lateral window opening. The side structure furthermore comprises at least one transparent side window. The feature of the side window being transparent can be understood as meaning in particular that the side window is light-permeable, in particular permanently or in at least one state. The side window is movable here relative to the side element between a closed position and at least one open position. In the closed position, the side window closes at least a partial region of the window opening. As a result, for example in the closed position, no objects and no moisture can penetrate the partial region of the window opening, and therefore, for example, no object and no moisture can penetrate the interior of the passenger vehicle from the outside. However, in the open position, the side window opens up at least the partial region of the window opening. If therefore, for example, the side window is in the open position, a person in the interior of the passenger vehicle can stretch their arm through the opened-up partial region of the window opening.

According to the invention, the side structure has a strut which extends at least substantially in the longitudinal direction of the vehicle or a strut which extends at least substantially in the horizontal direction and on which the side window is held via a joint device so as to be movable relative to the side element and relative to the strut. The side window is held via the joint device on the strut so as to be movable in such a manner that the side window can be moved outward in the transverse direction of the vehicle and downward in the vertical direction of the vehicle from the closed position into the open position. In other words, in order to move the side window from the closed position into the open position and thus to open same, the side window is moved relative to the side element and relative to the strut first of all outward in the transverse direction of the vehicle and then downward in the vertical direction of the vehicle. In order, by contrast, to move the side window from the open position into the closed position and thus to close same, the side window is moved relative to the side element and relative to the strut first of all upward in the vertical direction of the vehicle and then inward in the transverse direction of the vehicle. According to the invention, the side window is therefore held on the strut so as to be movable in the manner of an outward swinging door, in particular with the difference that the side window is not movable forward and rearward in the longitudinal direction of the vehicle, for example like an outward swinging door of a bus, for example, but rather upward and downward in the vertical direction of the vehicle.

The invention is based in particular on the following findings.

The appearance, that is to say the external impression, of motor vehicles, such as, for example, passenger vehicles, is continuously changed and developed. One aim is to design the passenger vehicle, or the outer skin thereof, to be particularly smooth and flush in order, for example, to be able to realize particularly advantageous aerodynamics. It is of advantage in this case if the side element, which is designed, for example, as a side wall or as part of a side wall, and a side door, which is possibly provided and is held movably on the side element, are smooth and flush with respect to each other such that excessive steps or offsets can be avoided. Furthermore, it can be of advantage if the side structure is glazed over the entire side or at least predominantly and is thus, for example, transparent. This results in structural elements, such as door handles, vehicle pillars or body pillars, for example B pillars, and possible window pockets which are conventionally provided, being intended to become invisible or even to disappear. This is not possible when the current window opening technology is used. However, the possibility of being able to open and close a side window should not be completely omitted since it can continue to be necessary for a person in the interior of the passenger vehicle to have to stretch their arm outward into the surroundings of the passenger vehicle in order, for example, to be able to drive into a car park or in general to interact physically with the surroundings outside the vehicle.

In the case of the side structure according to the invention, it is now possible to integrate the side window, which is designed as an openable window, into an at least substantially continuous vehicle front. In comparison to conventional window openers, the joint device is a changed window mechanism enabling the side window to be moved particularly advantageously between the open position and the closed position. Extensive freedom in the configuration of the design, that is to say the external appearance of the side structure and therefore of the passenger vehicle as a whole, can consequently be created. In addition, the invention makes it possible to produce transparent or semi-transparent surfaces below what is referred to as the shoulder line. In addition, design possibilities of the side element, designed, for example, as a side wall, are no longer determined by what is referred to as the window unwindability that is conventionally provided. The invention makes it possible for complex geometries of the side element and possible glass surfaces to be comprehensively realized. In addition, a gradual transition from paint to transparent surfaces is possible, in particular without visible edges. One of the transparent surfaces is formed, for example, by the side window which is light-permeable or transparent. At least one region of the side structure, in particular of the side element, that, at least in the closed position, adjoins the side window downward in the vertical direction of the vehicle and/or rearward in the longitudinal direction of the vehicle and/or forward in the longitudinal direction of the vehicle has, for example, a basic body and a coating which is in the form of paint and with which the basic body is formed. The basic body per se can be, for example, transparent and thus light-permeable, wherein the basic body which is light-permeable per se is provided with the paint and is thus coated. The paint per se can be, for example, opaque, and therefore the region mentioned is opaque per se. Furthermore, it is conceivable for the paint to likewise be transparent or light-permeable, and therefore the region is likewise transparent or light-permeable. It is preferably provided that the region is less transparent or less light-permeable in comparison to the side window and is thus for example semi-transparent in relation to the side window which is formed, for example, from glass. The side window and/or the basic body can be formed here from glass.

The use of the strut running at least substantially in the longitudinal direction of the vehicle enables, for example, a vehicle pillar that is conventionally provided and is designed as a B pillar to be saved, and therefore the side structure can be configured particularly advantageously. The strut in the case of the side structure according to the invention is used as a support on which the side window is held movably via the joint device, in particular in the manner of an outward swinging door mechanism.

In an advantageous refinement of the invention, the side window is held displaceably on the joint device and is thereby displaceable, at least in the open position, in the vertical direction of the vehicle relative to the joint device, relative to the strut and relative to the side element. The window opening can thereby be opened up over a particularly large area, and therefore, for example, a person in the interior of the passenger vehicle can stretch their arm particularly simply and comfortably through the opened-up partial region and to the outside.

In a particularly advantageous embodiment of the invention, an outer side of the side window facing outward in the transverse direction of the vehicle at least in the closed position is arranged flush with an outer side of the side element facing outward in the transverse direction of the vehicle, in the closed position, wherein, for example, the outer side of the side element in the closed position adjoins the outer side of the side window, in particular directly, downward in the vertical direction of the vehicle and/or forward in the longitudinal direction of the vehicle and/or rearward in the longitudinal direction of the vehicle. A particularly advantageous design of the passenger vehicle can thereby be ensured. In addition, advantageous aerodynamics of the passenger vehicle can be produced since excessive steps or offsets causing air swirling can be avoided.

A further embodiment is distinguished in that the side element is transparent per se.

It has been shown as furthermore advantageous if the side element has a basic body which is transparent per se and is thus light-permeable. The basic body is provided, for example, with a coating, in particular with a paint, and is thus coated, with the paint preferably being opaque or else being light-permeable. As a result, the side element as a whole can be light-permeable, with the side element preferably being less light-permeable than the side window. The side element can thus be semi-transparent. A particularly advantageous interior of the passenger vehicle can thereby be produced.

In a particularly advantageous embodiment of the invention, it is provided that the side window tapers downward and/or upward in the vertical direction of the vehicle at least in the closed position. This makes it possible to avoid collisions of the side window with other components of the passenger vehicle, in particular whenever the side window is opened.

In a particularly advantageous embodiment of the invention, the side window is trapezoidal. The side window can thereby be configured to be of an adequate size. At the same time, collisions of the side window with other components of the passenger vehicle can be safely avoided.

In order, for example, to avoid collisions of the side window with other components of the passenger vehicle and to ensure, for example, safe opening of a side door of the passenger vehicle, in particular while the side window is in its open position, it is provided, in a further refinement of the invention, that, in the closed position of the side window, at least a partial region of the side window is overlapped or covered by the side element forward in the longitudinal direction of the vehicle and/or rearward in the longitudinal direction of the vehicle.

In a further advantageous refinement of the invention, the side element is held movably on a body of the passenger vehicle, which is designed in particular as self-supporting bodywork, and is movable, in particular pivotable, relative to the body between a blocking position and at least one release position. The side element is thus, for example, a or the previously mentioned side door. In the blocking position, the side element closes at least a partial region of a lateral door opening delimited by the body, wherein the side element in the release position opens up at least the partial region of the lateral door opening. Since the side element is held movably on the body of the passenger vehicle, the side window is held movably on the body via the side element, and therefore the side window together with the side element is movable, in particular pivotable, relative to the body. The side window can be moved here relative to the side element and relative to the body between the open position and the closed position. This creates particularly extensive freedom in the design of the passenger vehicle as a whole. In particular, particularly advantageous aerodynamics can be produced.

A second aspect of the invention relates to a passenger vehicle which has at least one side structure, in particular at least one side structure according to the invention. The side structure comprises at least one side element which at least partially, in particular at least predominantly or completely, delimits a lateral window opening. In addition, the side structure comprises at least one transparent side window which is movable relative to the side element between a closed position closing at least a partial region of the window opening and at least one open position opening up a partial region of the window opening.

It is provided according to the invention that the side structure has a strut which extends in the longitudinal direction of the vehicle and on which the side window is held via a joint device so as to be movable relative to the side element and relative to the strut.

The side window is held on the strut via the joint device so as to be movable relative to the side element and relative to the strut in such a manner that the side window is movable, in particular in the manner of an outward swinging door, outward in the transverse direction of the vehicle and downward in the vertical direction of the vehicle from the closed position into the open position. Advantages and advantageous refinements of the first aspect of the invention should be considered to be advantages and advantageous refinements of the second aspect of the invention, and vice versa.

Details of the invention emerge below with reference to the description of the figures and the drawing.

BRIEF DESCRIPTION OF THE DRAWINGS

Identical or functionally identical elements are provided with the same reference signs in the figures.

DETAILED DESCRIPTION OF THE DRAWINGS

Figure 1:
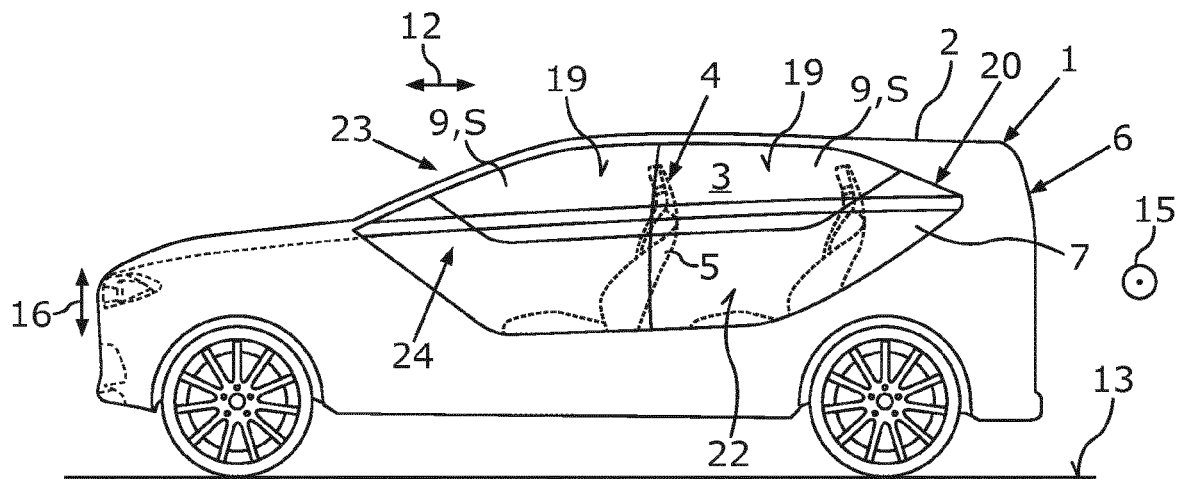
FIG. 1 shows a schematic side view of a passenger vehicle according to an embodiment of the invention, wherein a side window of a side structure of the passenger vehicle is in its closed position.

FIG. 1 shows, in a schematic side view, a passenger vehicle 1, wherein the left side of the passenger vehicle 1 in the transverse direction of the vehicle can be seen in FIG. 1. The passenger vehicle 1 has, for example, a body 2 which is preferably in the form of self-supporting bodywork. The body 2 delimits an interior 3 of the passenger vehicle 1, wherein people can spend time in the interior 3. For this purpose, at least one seat system 4 on which at least one person can sit is arranged in the interior 3. The seat system 4 thus has, for example, at least one seat on which a person can sit. In particular, the seat system 4 can have a plurality of seats for a plurality of people, and therefore there a plurality of people can spend time in the interior 3 at the same time. For example, the seat system 4 comprises at least one or more individual seats, which are also referred to as vehicle seats and which each provide precisely one seat for one person. Such an individual seat can be seen in FIGS. 1 and 2 and is denoted there by 5.

Figure 2:
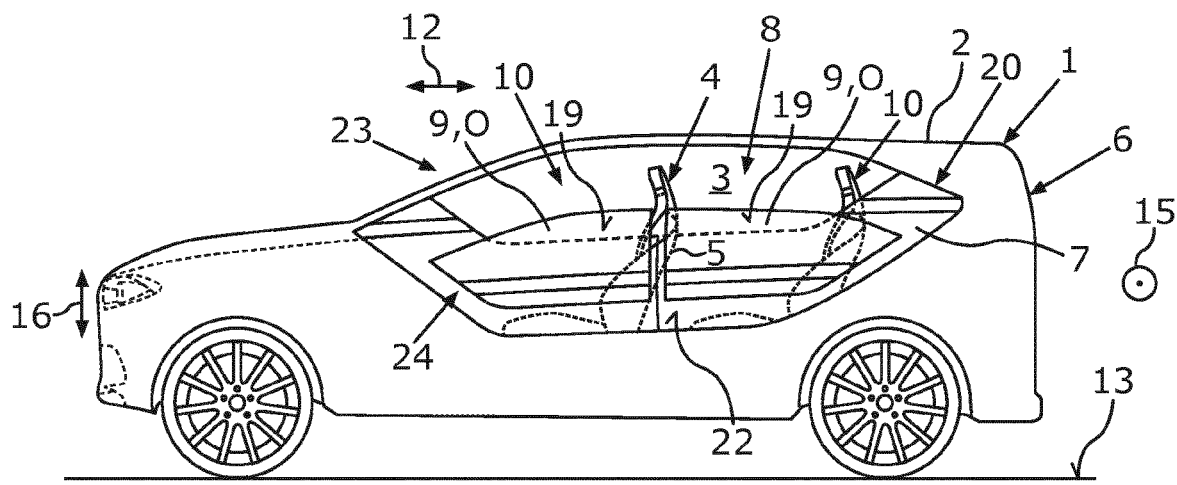
FIG. 2 shows a schematic side view of the passenger vehicle, wherein the side window is in its open position.

The interior 3 is delimited outward in the transverse direction of the vehicle by respective side structures of the body 2 and thus of the passenger vehicle 1, wherein the side structure which is on the left in the transverse direction of the vehicle and is denoted by 6 can be seen in FIGS. 1 and 2. The side structure 6 has at least one side element 7 which can be part of the body 2. Alternatively, the side element 7 can be held, in particular movably, on the body 2. As can be seen particularly readily in an overall view together with FIG. 2, the side element 7 at least partially, in particular at least predominantly, delimits at least one or precisely one lateral window opening 8. Thus, for example, the side element 7 delimits the window opening 8 at least by up to more than half.

The side structure 6 also has at least one transparent and thus light-permeable side window 9. It can be seen from FIG. 2 that, in the exemplary embodiment illustrated in the figures, the side structure 6 has a plurality of side windows 9 formed separately from one another. The respective side window 9 is movable relative to the side element 7 between a closed position shown in FIG. 1 and at least one open position shown in FIG. 2. In the closed position, the respective side window 9 closes at least a respective partial region 10 of the window opening 8. However, in the respective open position, the respective side window 9 opens up the respective partial region 10 of the window opening 8.

Figure 3:
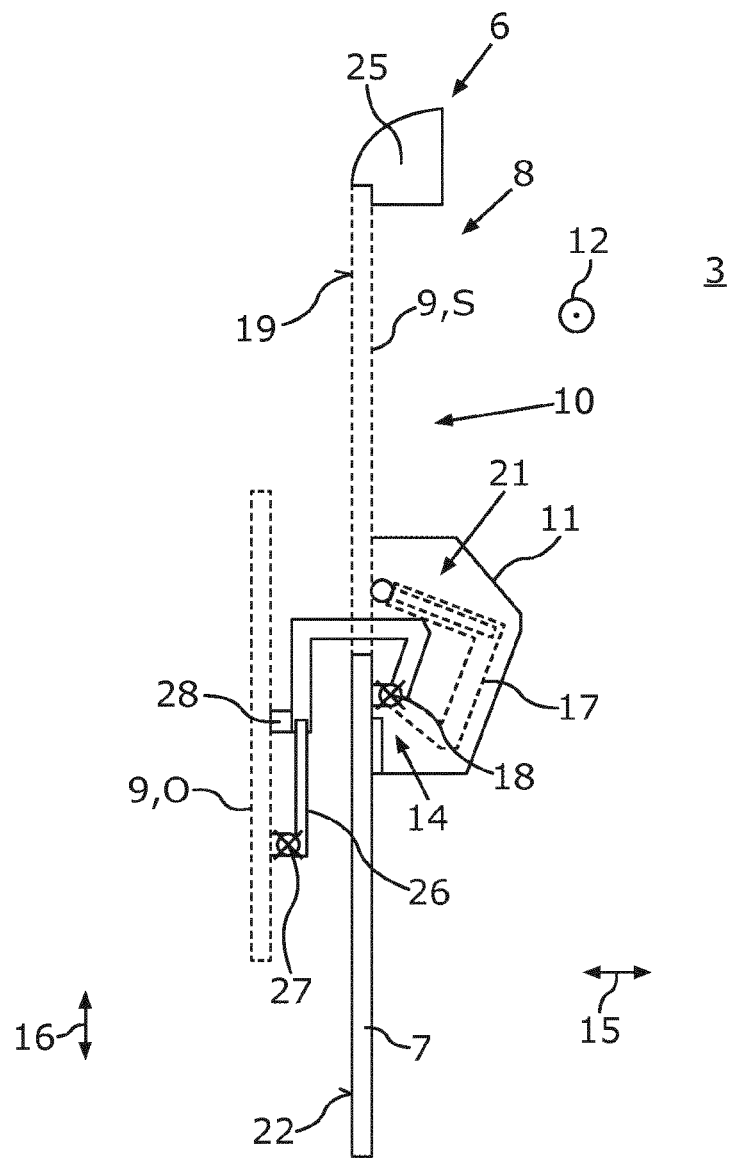
FIG. 3 shows part of a schematic sectional view of the side structure.

In order now to be able to realize extensive freedom in respect of the design of the side structure 6 and thus of the body 2 as a whole, as can be seen in an overall view together with FIG. 3 the side structure 6 has at least one lateral strut 11 which extends at least substantially in the longitudinal direction of the vehicle. The longitudinal direction of the vehicle is illustrated in the figures by a double arrow 12. The strut 11, which is also referred to as a side strut, is, for example, part of the side element 7 and runs in particular at least substantially horizontally if the passenger vehicle 1 is standing at least substantially horizontally on an at least substantially horizontal plane 13.

Furthermore, the side structure 6 has a joint device 14 (FIG. 3) via which the side window 9 is held movably on the strut 11. The side window 9 is held on the strut 11 so as to be movable via the joint device 14 relative to the side element 7 and relative to the strut 11 in such a manner that the side window is movable outward in the transverse direction of the vehicle and downward in the vertical direction of the vehicle from the closed position, denoted by S in FIG. 3, into the open position, denoted by O in FIG. 3. In other words, in order to open the side window 9, which is initially in the closed position S, the side window 9 is first of all moved outward in the transverse direction of the vehicle and then downward in the vertical direction of the vehicle. The transverse direction of the vehicle is illustrated in FIG. 3 by a double arrow 15 while the vertical direction of the vehicle is illustrated by a double arrow 16. In order to close the side window 9 which is initially in the open position O and is thus open, i.e. in order to move same into the closed position S, the side window 9 is moved relative to the strut 11 and relative to the side element 7 first of all upward in the vertical direction of the vehicle and then inward in the transverse direction of the vehicle. The side window 9 can thereby be moved relative to the strut 11 and relative to the side element 7 in the manner of an outward swinging door.

The joint device 14 comprises a hinge element 17 which is held on the strut 11 so as to be pivotable about a first pivot axis 18. The pivot axis 18 runs at least substantially in the longitudinal direction of the vehicle. The hinge element 17 is furthermore coupled in an articulated manner to the side window 9 such that the side window 9 is coupled to the hinge element 17 in a manner so as to be pivotable about a second pivot axis 27. The pivot axes 18 and 27 are spaced apart from each other and run parallel to each other. During opening and closing of the side window 9, the hinge element 17 is pivoted about the pivot axis 18 relative to the strut 11 and thus relative to the side element 7, and the side window 9 is pivoted relative to the hinge element 17, in particular in such a manner that an outer side 19 of the side window 9 facing outward in the transverse direction of the vehicle at least in the closed position S always faces outward in the transverse direction of the vehicle. The strut 11 is connected at least indirectly, in particular directly, to the side element 7 and in particular is secured to the side element 7.

In addition, the side window 9 is held displaceably on the hinge element 17 and thus on the joint device 14, as a result of which, at least in the open position O, the side window 9 is displaceable in the vertical direction of the vehicle relative to the joint device 14, in particular relative to the hinge element 17, relative to the strut 11 and relative to the side element 7. The side window 9, for example after it has been pivoted outward in the transverse direction of the vehicle and downward in the vertical direction of the vehicle, can therefore be lowered further downward in the vertical direction of the vehicle. The partial region of the window opening 8 denoted by T in FIG. 3 can thereby be opened up over a particularly large area. The strut 11 is arranged, for example, at mid-height of the side element 7 in the vertical direction of the vehicle, as a result of which, when the partial region T is opened up, a person in the interior 3 can reach outward particularly easily and comfortably.

The side window 9 is transparent and is thus light-permeable. The side window 9 can be formed from glass. Furthermore, it is conceivable for the side element 7, in particular in its completely manufactured state, to be transparent. For this purpose, the side element 7 can have a basic body which can be transparent per se and can thus be light-permeable. The basic body can be provided with a coating in particular in the form of a paint and can thus be coated. The paint can be opaque, and therefore the side element 7 as a whole or in its completely manufactured state is then opaque. Furthermore, it is conceivable for the paint to be light-permeable, and therefore the side element 7 is then light-permeable. It is preferably provided that the side element 7 is less light-permeable than the side window 9.

The side element 7 is designed, for example, as a side door which is held movably, in particular pivotably, on the body 2 and is thus movable, in particular pivotable about a pivot axis, relative to the body between a locking position and at least one open position. The pivot axis about which the side door is pivotable relative to the body 2 runs, for example, at least substantially in the vertical direction of the vehicle. If the side element 7 is then formed transparently or from a glass, the side element 7 is designed, for example, as a transparent or else painted glass door. In the blocking position shown for example in FIGS. 1 and 2, the side element 7 (side door) closes at least a partial region of a lateral door opening 20 delimited by the body 2. In the release position, the side door (side element 7) opens up at least the partial region of the door opening 20 such that, when the side element 7 is in the release position, at least one person can enter the interior 3 or can exit from the interior 3 via the opened-up partial region of the door opening 20.

The strut 11 acts as a support and has sufficient load-bearing capability in order to support the side window 9. A closing device can be provided on, in particular in, the strut 11 in order, for example, to close or to lock the side window 9. As can be seen from FIG. 3, it can be provided that the strut 11 has an, in particular open, hollow cross section 21, wherein, in the closed position S, the hinge element 17 is at least partially, in particular at least predominantly or completely, accommodated in the hollow cross section 21 and thus in the strut 11. It can be seen overall that the joint device 14 acts as a window lowering mechanism which can be used to move the side window 9 between the closed position S and the open position O. The joint device 14 is not visible, for example, either from the inside, that is to say either from the interior 3, or from the outside, that is to say from the surroundings of the passenger vehicle 1. For this purpose, for example, the joint device 14 is covered inward in the transverse direction of the vehicle by the strut 11 at least in the closed position S.

The side element 7 has an outer side 22 facing outward in the transverse direction of the vehicle. The outer side 19 of the side window 9 is arranged flush with the outer side 22 in the closed position S and outward in the transverse direction of the vehicle. This can ensure particularly advantageous aerodynamics of the passenger vehicle 1. In addition, at least in the closed position S, the side window 9 tapers downward and upward in the vertical direction of the vehicle. For this purpose, both the upper half 23 and the lower half 24 of the side window 9 are trapezoidal. Furthermore, in the closed position S, at least part of the side window 9 is covered by the side element 7 forward or rearward in the longitudinal direction of the vehicle. This makes it possible to avoid collisions of the side window 9 when the side window 9 is in its open position 0 and the side door (side element 7) is opened at the same time.

The joint device 14 is a mechanism for opening and closing the side window 9, wherein the mechanism is based on an outward swinging door mechanism, for example of bus doors. The side window 9 is not lowered here in the side door, but rather is opened outward and downward. The side structure 6 has an upper shoulder 25 (FIG. 3) on which the side window 9 is supported from the outside inward in the closed position S and in the transverse direction of the vehicle. In the closed position S, the side window 9 thus lies in a sealing manner on the shoulder 25 such that no water or no moisture can penetrate between the side window 9 and the shoulder 25 in the closed position S. In order to be able to couple the side window 9 in an articulated manner to the hinge element 17 and to be able to displace same relative to the hinge element 17 in the vertical direction of the vehicle, a connecting element 26, also referred to as connecting piece, is provided. The connecting element 26 is coupled in an articulated manner to the side window 9 such that the side window 9 is pivotable relative to the connecting element 26 about the pivot axis 27.

In addition, the connecting element 26 is held on the hinge element 17 so as to be displaceable relative to the hinge element 17. In order, for example, to be able to move the side window 9 in the closed position S even further downward in the vertical direction of the vehicle and thus to lower it further, the connecting element 26 is at least partially extended out of the hinge element 17 and moved downward in the vertical direction of the vehicle. In order to raise the side window in the closed position S, that is to say to move same upward in the vertical direction of the vehicle, the connecting element 26 is at least partially retracted, that is to say moved, into the hinge element 17. In order, for example, to be able to ensure a particularly high level of stability, the side window 9 can be provided with a guide rail in which, for example, the side window 9 latches in the open position O.

In other words, for example, a locking device 28 is provided, by means of which the side window 9 can be secured or is secured, at least in the open position O, against rotational movements or pivoting movements taking place about the pivot axis 27 and relative to the hinge element 17. The locking device 28 permits translatory movements of the side window 9 taking place, for example, in the vertical direction of the vehicle and relative to the hinge element 17 such that the side window 9 and the connecting element 26 can be displaced in the vertical direction of the vehicle relative to the hinge element 17 and relative to the side element 7. In the closed position S, the locking device 28 is arranged in the strut 11, and therefore the locking device 28 is covered or concealed by the strut inward in the transverse direction of the vehicle and thus toward the interior 3 in the closed position S.

The locking device 28 comprises, for example, the previously mentioned guide rail which is provided, for example, on the side window 9 or else on the hinge element 17. When the side window 9 is moved from the closed position S into the open position O, the side window 9 comes into, in particular form-fitting, interaction with the guide rail, as a result of which the side window 9 is secured against rotational movements taking place about the pivot axis 27 and relative to the hinge element 17. However, the guide rail permits the previously described relative displacements, taking place in the vertical direction of the vehicle, between the side window 9 and the hinge element 17. The fact that the side window 9 is lowered in front of and not into the side element 7 affords the advantage that the side window 9, which also simply referred to as window, no longer has to correspond to the rounding of the side element 7 (side door), may have beads and does not have to have any shoulder downward for sealing purposes. In order to be able to ensure advantageous aerodynamics of the passenger vehicle 1, it is preferably provided to block the joint device 14 above a speed or to design it in such a manner that undesirable aerodynamic effects that might put the load-bearing capacity of the design at risk do not arise.

LIST OF REFERENCE SIGNS

1 Passenger vehicle
2 Body
3 Interior
4 Seat system
5 Individual seat
6 Side structure
7 Side element
8 Window opening
9 Side window
10 Partial region
11 Strut
12 Double arrow
13 Plane
14 Joint device
15 Double arrow
16 Double arrow
17 Hinge element
18 Pivot axis
19 Outer side
20 Door opening
21 Hollow cross section
22 Outer side
23 Upper half
24 Lower half
25 Shoulder
26 Connecting element
27 Pivot axis
28 Locking device
O Open position
S Closed position

What is claimed is:

1. A side structure for a passenger vehicle, comprising:
   a side element, which at least partially delimits a lateral window opening having an upper edge and a lower edge;
   a transparent side window, which is movable relative to the side element between a closed position closing at least a partial region of the window opening and at least one open position opening up the partial region of the window opening;
   a strut of the side structure that extends in a longitudinal direction of the vehicle along the lower edge of the window opening; and
   a joint device via which the side window is held on the strut so as to be movable relative to the side element and relative to the strut,
   wherein the side window is connected to the joint device substantially at a pivot axis located at a lower edge of the side window via which pivot axis the side window is movable outward in a transverse direction of the vehicle and downward in a vertical direction of the vehicle from the closed position into the open position such that a distal portion of the joint device adjacent the pivot axis is substantially vertically oriented.

2. The side structure according to claim 1, wherein the side window is held displaceably on the joint device and is thereby displaceable, at least in the open position, in the vertical direction of the vehicle relative to the joint device, relative to the strut and relative to the side element.

3. The side structure according to claim 1, wherein an outer side of the side window facing outward in the transverse direction of the vehicle at least in the closed position is arranged flush with an outer side of the side element facing outward in the transverse direction of the vehicle, in the closed position.

4. The side structure according to claim 1, wherein the side element is transparent.

5. The side structure according to claim 1, wherein the side window tapers downward and/or upward in the vertical direction of the vehicle at least in the closed position.

6. The side structure according to claim 5, wherein the side window is trapezoidal.

7. The side structure according to claim 1, wherein in the closed position, at least a partial region of the side window is overlapped by the side element forward in the longitudinal direction of the vehicle.

8. The side structure according to claim 1, wherein in the closed position, at least a partial region of the side window is overlapped by the side element rearward in the longitudinal direction of the vehicle.

9. The side structure according to claim 1, wherein the side element is held movably on a body of the passenger vehicle, and is movable relative to the body between a locking position, in which the side element closes at least a partial region of a lateral door opening delimited by the body, and a release position, in which the side element opens up the partial region of the lateral door opening.

10. The side structure according to claim 1, wherein the joint device includes a bent-hinge element, the side structure further comprising:
    a connecting piece that is displaceably held within the bent-hinge element so as to at least partially extend out of the bent-hinge element and thereby permit further movement of the side window in a vertical direction when the side window is in the open position.

11. The side structure according to claim 10, further comprising:
    a locking device that permits the further movement of the side window in the vertical direction, and prohibits pivoting movement of the side window with respect to the bent-hinge element, when the side window is in the open position.

12. The side structure according to claim 1, wherein the joint device includes a bent-hinge element forming a cavity that, when the side window is in an open position, accepts the side element therein.

13. A passenger vehicle, comprising:
at least one side structure, which has at least one side element at least partially delimits a lateral window opening having an upper edge and a lower edge, and at least one transparent side window, which is movable relative to the side element between a closed position closing at least a partial region of the window opening and at least one open position opening up the partial region of the window opening,
wherein the at least one side structure has a strut, which extends in a longitudinal direction of the vehicle along the lower edge of the window opening and on which the side window is held via a joint device, so as to be movable relative to the side element and relative to the strut such that the side window is movable outward in a transverse direction of the vehicle and downward in a vertical direction of the vehicle from the closed position into the open position, and wherein the side window is connected to the joint device substantially at a pivot axis located at a lower edge of the side window via which pivot axis the side window is movable outward in the transverse direction of the vehicle and downward in the vertical direction of the vehicle from the closed position into the open position such that a distal portion of the joint device adjacent the pivot axis is substantially vertically oriented.

* * * * *